United States Patent
Ramamoorthy et al.

(10) Patent No.: US 12,039,860 B2
(45) Date of Patent: Jul. 16, 2024

(54) DRIVING SCENARIOS FOR AUTONOMOUS VEHICLES

(71) Applicant: Five AI Limited, Bristol (GB)

(72) Inventors: Subramanian Ramamoorthy, Edinburgh (GB); Majd Hawasly, Edinburgh (GB); Francisco Eiras, Edinburgh (GB); Morris Antonello, Edinburgh (GB); Simon Lyons, Edinburgh (GB); Rik Sarkar, Edinburgh (GB)

(73) Assignee: Five AI Limited, Cambridge (GB)

( * ) Notice: Subject to any disclaimer, the term of this patent is extended or adjusted under 35 U.S.C. 154(b) by 565 days.

(21) Appl. No.: 17/285,269

(22) PCT Filed: Oct. 16, 2019

(86) PCT No.: PCT/EP2019/078067
§ 371 (c)(1),
(2) Date: Apr. 14, 2021

(87) PCT Pub. No.: WO2020/079069
PCT Pub. Date: Apr. 23, 2020

(65) Prior Publication Data
US 2021/0339772 A1    Nov. 4, 2021

(30) Foreign Application Priority Data

Oct. 16, 2018 (GB) .................................... 1816850
Oct. 16, 2018 (GB) .................................... 1816852
Oct. 16, 2018 (GB) .................................... 1816853

(51) Int. Cl.
*G08G 1/01* (2006.01)
*B60W 40/04* (2006.01)
(Continued)

(52) U.S. Cl.
CPC .......... *G08G 1/0116* (2013.01); *B60W 40/04* (2013.01); *B60W 50/0097* (2013.01);
(Continued)

(58) Field of Classification Search
None
See application file for complete search history.

(56) References Cited

U.S. PATENT DOCUMENTS 10,297,148 B2 * 5/2019 Sumers .................. G06V 20/56
10,509,409 B2 * 12/2019 Bhatia .................. G05D 1/0088
(Continued)

OTHER PUBLICATIONS

International Search Report and Written Opinion for International Application No. PCT/EP2019/078067 dated Jun. 23, 2020.
(Continued)

*Primary Examiner* — Todd Melton
(74) *Attorney, Agent, or Firm* — Andrew J. Tibbetts; Samuel S. Stone; Greenberg Traurig, LLP

(57) ABSTRACT

One aspect herein provides a method of analysing driving behaviour in a data processing computer system, the method comprising: receiving at the data processing computer system driving behaviour data to be analysed, wherein the driving behaviour data records vehicle movements within a monitored driving area; analysing the driving behaviour data to determine a normal driving behaviour model for the monitored driving area; using object tracking to determine driving trajectories of vehicles driving in the monitored driving area; comparing the driving trajectories with the normal driving behaviour model to identify at least one abnormal driving trajectory; and extracting a portion of the driving behaviour data corresponding to a time interval associated with the abnormal driving trajectory.

18 Claims, 4 Drawing Sheets

(51) Int. Cl.

| | |
|---|---|
| *B60W 50/00* | (2006.01) |
| *B60W 60/00* | (2020.01) |
| *G05B 13/02* | (2006.01) |
| *G05B 13/04* | (2006.01) |
| *G06F 18/20* | (2023.01) |
| *G06F 18/214* | (2023.01) |
| *G06F 18/24* | (2023.01) |
| *G06N 3/045* | (2023.01) |
| *G06T 7/20* | (2017.01) |
| *G06V 10/84* | (2022.01) |
| *G06V 20/54* | (2022.01) |
| *G06V 20/56* | (2022.01) |
| *H04N 7/18* | (2006.01) |

(52) U.S. Cl.
CPC .... *B60W 60/0013* (2020.02); *B60W 60/0015* (2020.02); *B60W 60/0027* (2020.02); *G05B 13/027* (2013.01); *G05B 13/04* (2013.01); *G06F 18/214* (2023.01); *G06F 18/24* (2023.01); *G06F 18/295* (2023.01); *G06N 3/045* (2023.01); *G06T 7/20* (2013.01); *G06V 10/84* (2022.01); *G06V 20/54* (2022.01); *G06V 20/56* (2022.01); *G08G 1/0129* (2013.01); *H04N 7/183* (2013.01); *B60W 2540/30* (2013.01); *B60W 2554/4046* (2020.02); *G06T 2207/20081* (2013.01); *G06T 2207/20084* (2013.01); *G06T 2207/30236* (2013.01); *G06T 2207/30241* (2013.01)

(56) References Cited

U.S. PATENT DOCUMENTS

| | | | |
|---|---|---|---|
| 2012/0134532 A1* | 5/2012 | Ni | G08G 1/0175 382/104 |
| 2013/0286208 A1* | 10/2013 | Bala | H04N 7/181 348/149 |
| 2018/0189664 A1* | 7/2018 | Hegde | G06N 7/01 |
| 2019/0164007 A1* | 5/2019 | Liu | G06F 18/2413 |

OTHER PUBLICATIONS

Invitation to Pay Additional Fees for International Application No. PCT/EP2019/078067 dated Apr. 1, 2020.

Deo et al., How would surround vehicles move? A Unified Framework for Maneuver Classification and Motion Prediction. ArXiv preprint ArXiv: 1801.06523v1. Jan. 19, 2018;1:1-12.

* cited by examiner

DRIVING SCENARIOS FOR AUTONOMOUS VEHICLES

RELATED APPLICATIONS

This Application is a national stage filing under 35 U.S.C. 371 of International Patent Application Serial No. PCT/EP2019/078067, filed Oct. 16, 2019, which claims priority to United Kingdom patent application number GB 1816852.6, filed Oct. 16, 2018, to United Kingdom patent application number GB 1816850.0, filed Oct. 16, 2018, and to United Kingdom patent application number GB 1816853.4, filed Oct. 16, 2018. Each of the foregoing applications is incorporated by reference herein in its entirety.

TECHNICAL FIELD

This disclosure pertains generally to techniques for analysing, extracting and/or simulating driving scenarios. The disclosed techniques have various applications in the field of autonomous vehicle (AV) technology. Examples of such applications include manoeuvre learning and other forms of machine learning (ML) training for autonomous vehicles (AVs) as well as safety/performance testing of AV systems.

BACKGROUND

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver.

SUMMARY

A core issue in the development of AV technology is the need to consider very large numbers of realistic driving scenarios across an AV operational design domain (ODD). For example, driving scenario simulation may be used as a basis for training various components within an AV runtime stack, such as planning and/or control components. To perform effectively, such components need to be trained over a sufficiently large set of training scenarios that is also sufficiently representative of the AV ODD as a whole.

One example application considered herein in the use of reinforcement learning (RL) to learn a policy according to which an AV may execute a planned manoeuvre. The policy is learned through repeated exposure to suitable simulated driving scenarios. Simulation may also be used for other forms of training of planning/control components.

Another application is simulation as a basis for safety testing or, more generally, performance testing. Such testing is crucial to ensure that an AV stack will perform safely and effectively in the real-world.

A driving scenario generally refers to a driving context (such as a particular road layout) within which a manoeuvre is to be performed by a (real or simulated) AV, and within which any number of external vehicles or other external actors (such as pedestrians) may be present. Hence, a typical driving scenario has both static and dynamic behavioural elements.

In the context of both training and testing, it is beneficial to expose a simulated AV (ego agent) to driving scenarios that are relatively "unusual" or "challenging" but nonetheless realistic.

Simulation may be of limited use if the simulated scenarios are not sufficiently realistic. For example, in a safety testing context, if an AV planner makes an unsafe decision in a simulated scenario that is completely unrealistic, that is much less useful in the context of safety testing than an instance of unsafe behaviour in a realistic scenario. Likewise, if a simulation-based training process is performed based on insufficiently realistic scenarios, the trained component(s) may not perform acceptable in the real-world.

One approach seeks to discover challenging driving scenarios based on actual driven test miles. If and when an AV encounters a scenario in which test driver intervention is necessary, the sensor outputs collected by the AV can be used to reconstruct, in a simulator, a driving scenario which necessitated test driver intervention. In other word, challenging scenarios are discovered based on the actual performance of an AV in the real-world. Variables of the scenario may be "fuzzed" in order to test variations of the real-world scenario that are still realistic. In this manner, more information about the cause of the unsafe behaviour can be obtained, analysed and used to improve prediction and planning models.

However, a significant problem arises because, as the number of errors per decision reduces, the number of test miles that need to be driven in order to find a sufficient number instance of unsafe behaviour increases. It has been estimated that, in order for an autonomous vehicle (AV) to achieve a level of safety that matches that of human drivers, a maximum of 1 error per $10^7$ autonomous driving decisions must be guaranteed across the entire ODD of the AV. A typical AV planner might take, on average, about 1 decision every two seconds. At an average speed of 20 miles per hour, that equates to around 90 decisions per mile driven. This, in turn, implies less than one error per $10^5$ driven miles in order to match a human level of safety. Robust safety testing would require many multiples of that to sufficiently test the AV across its ODD. For those reasons, this approach is simply not viable when testing at a level of safety approaching that of humans.

By contrast, there is provided herein an alternative mechanism for automatically discovering unusual, but nevertheless realistic, driving scenarios, which does not rely on actual driven test miles.

A first aspect of the present disclosure provides a method of analysing driving behaviour in a data processing computer system, the method comprising:
  receiving at the data processing computer system driving behaviour data to be analysed, wherein the driving behaviour data records vehicle movements within a monitored driving area;
  analysing the driving behaviour data to determine a normal driving behaviour model for the monitored driving area;
  using object tracking to determine driving trajectories of vehicles driving in the monitored driving area;
  comparing the driving trajectories with the normal driving behaviour model to identify at least one abnormal driving trajectory; and extracting a portion of the driving behaviour data corresponding to a time interval associated with the abnormal driving trajectory.

Using this method, even large sets of driving behaviour data can be "mined" for incidents of abnormal driving behaviour in a systematic and scalable manner. One application of the method is to mine the driving behaviour data for "difficult" examples of abnormal diving behaviour that may be used in the context of sophisticated autonomous vehicle training. A second application is performance testing to ensure the AV stack performs acceptably in realistically-difficult scenarios. The method can also be applied in other contexts.

The terms "abnormal" and "anomalous" are used interchangeably herein.

In embodiments, the comparing step may be performed to determine a conditional probability $p(\tau_n|M)$ each driving trajectory $\tau_n$, which is a probability of that trajectory $\tau_n$ occurring given the normal behaviour model M.

The at least one driving trajectory may be classed as abnormal with respect to a probability threshold.

The normal driving behaviour model may be a spatial Markov model (SMM) based on a plurality of spatial regions within the monitored driving area, wherein at least one of the following is computed:
an estimated occupancy probability associated with each spatial region, and
an estimated transition probability associated with each of a plurality of spatial region pairs.

The conditional probability $p(\tau_n|M)$ may be determined based on at least one of: the occupancy probabilities occupancy and the transition probabilities associated with a series of the spatial regions traversed by the driving trajectory $\tau_n$.

The spatial regions may be cells of a grid overlaid on the monitored driving area, the grid being shaped to take into account road structure and/or other structure in the monitored driving area.

The structure may be manually determined or automatically determined from a map associated with the driving area.

The driving behaviour data may be in the form of image data. For example, the image data may comprise closed circuit television (CCTV) data collected from at least one CCTV image capture device arranged to monitor the driving area.

The method may comprise the step of processing the extracted portion of driving behaviour data in order to generate driving scenario simulation data for simulating a driving scenario in which an ego vehicle agent is exposed to abnormal driving behaviour exhibited by one or more external agents.

The method may comprise the step of running the driving scenario simulation in a simulator in a training process, in order to train at least one component for an autonomous vehicle decision engine.

The component may be trained using reinforcement learning.

For example, the component may be a policy for executing a selected manoeuvre.

The method may comprise the step of using the driving scenario simulation data running a simulated driving scenario in a simulator in a performance testing process, in order to performance test at least one component for implementing in an autonomous vehicle on-board computer system.

The simulated driving scenario may be an approximation of a real-world driving scenario captured in the extracted portion of driving behaviour data.

The simulated driving scenario may be artificially-generated by a scenario generator trained on a training set of multiple examples of abnormal driving behaviour extracted from the driving behaviour data.

For example, the scenario generator may take the form of a generative adversarial network (GAN).

In embodiments, a conditional probability $p(\tau_n|M)$ may, for example, be determined for driving trajectory $\tau_n$, which is a probability of that trajectory $\tau_n$ occurring given the normal behaviour model M. A driving trajectory $\tau_n$ with a relatively low conditional probability $p(\tau_n|M)$ (e.g. below a threshold) is classed as abnormal with respect to the normal behaviour model M.

In embodiments, the normal driving behaviour model may be a spatial Markov model (SMM) based on a plurality of spatial regions within the monitored driving area, in which at least one of the following is computed:
an estimated occupancy probability associated with each spatial region, and
an estimated transition probability associated with each of a plurality of spatial region pairs.

The spatial regions may be cells of a grid overlaid on the monitored driving area. This may take into account road structure and/or other structure in the monitored driving area, which may be manually annotated or determined from a map (for example).

Hereinbelow, the notation $p_i$ means the estimated occupancy probability for spatial region i and $p_{i,j}$ means the estimated probability of a transition from spatial region i to spatial region j. With a SMM, $p(\tau_n|M)$ may be determined based on the occupancy and/or transition probabilities associated with a series of the grid cells (or other spatial regions) traversed by a driving path (trajectory) $\tau_n$.

There are a number of reasons why the abnormal trajectory might has occurred. One reason might be that the object tracking has failed, resulting in a driving trajectory that does not reflect the actual trajectory of a real-world vehicle. However, another more interesting reason is that a real-world vehicle has actually exhibited abnormal behaviour, of the kind that an AV might occasionally encounter in real-life and which it needs to be able to respond to safely.

Hence the method may comprise a step of verifying that the extracted portion of driving behaviour data captures an incident of abnormal driving behaviour. This could be a manual check, or it could be verified using automated data processing.

The driving behaviour data can comprise any form of sensor data, such as image data and/or motion sensor data etc. The data can be collected in any suitable manner, but CCTV (close circuit television) systems provide a particularly convenient means of collecting driving behaviour data, particularly in urban environments with good CCTV coverage. For example, the present disclosure recognizes that CCTV from complex driving contexts (e.g. complex roundabouts, multi-lane junctions, blind corners etc.) provides a rich source of driving behaviour data that may be mined for abnormal behaviour incidents.

The method may be performed by a data processing component, and the data processing component may process the extracted portion of driving behaviour data in order to generate driving scenario simulation data. Such driving scenario simulation data may, in turn, be used to simulating a driving scenario in which abnormal driving behaviour is exhibited by one or more external agents. In a training or testing context, for example, this can be used to expose the ego agent to abnormal, but nevertheless realistic, driving behaviour so that it may learn to respond to such behaviour appropriately as part of its training/testing.

There are various ways to go about this.

One way is to create a simulated driving scenario that is a recreation of a real-world driving scenario captured in the extracted portion of driving behaviour data. In other words, the ego agent is exposed to an approximation of the real-world driving scenario, including the abnormal driving behaviour as it occurred in real life.

Another way is to use extracted portions of driving behaviour embodying real driving scenarios as a set of training data to train a generative model to generate new driving scenarios in which abnormal driving behaviour is exhibited. The generative model learns to generalize from the examples of the training data, such that it can create new driving scenarios with abnormal driving behaviour that remains realistic but does not necessarily correspond to any one real-life driving scenario captured in the training set.

This is particularly useful for generating new driving scenarios in which abnormal but realistic driving behaviour occurs. However, this generative approach is not in fact limited in this respect, and can be used to generate any desired type of realistic driving scenario (which may or may not include abnormal driving behaviour).

For example, a generative adversarial network (GAN) may be used to this end.

A second aspect of the present disclosure provides a computer-implemented method of training a scenario generator to generate driving scenarios, in which a training set of real driving scenarios is extracted from real-world driving scenario data, and the training set is used to train the scenario generator to generate artificial driving scenarios corresponding to the training set. For example, the method may comprise receiving, at a scenario classifier, real driving scenarios from the training set and artificial driving scenarios generated by the scenario generator, and, in a process of training the scenario generator and the scenario classifier, incentivising the scenario classifier to accurately classify the received driving scenarios as real or artificial, whilst also incentivising the scenario generator to generate artificial driving scenarios which the scenario classifier classifies as real.

In embodiments, the training set may comprise examples of driving behaviour data classified as abnormal with respect to a normal driving behaviour model.

The training set may comprise examples of driving behaviour data classified as normal with respect to a normal driving behaviour model.

Artificial driving scenarios as generated by the scenario generator, once trained, may be used in a reinforcement learning process, in which an autonomous vehicle agent learns to respond appropriately in the artificial driving scenarios. Knowledge learned in the reinforcement learning process may, in turn, be incorporated in a decision engine of an AV, to allow the AV to respond to appropriately in real-world driving scenarios it encounters.

For example, a policy learned in the reinforcement learning process may be incorporated into the AV decision engine.

Although simulation is considered above in various contexts, the present disclosure is not limited in this respect. For example, real-world driving scenarios may also be used as a basis for training prediction components within the AV stack, i.e. for making "online" predictions that, in turn, may feed into planning/control. For example, reference is made above to a driving behaviour model in the context of the first aspect of the present disclosure. As an alternative (or in addition to) the use of the driving behaviour model to detect instances of abnormal driving behaviour, a driving behaviour model determined in this way for a driving area may be used as a basis for AV planning for that driving area. That is to say, a driving behaviour model learned in this way may be incorporated within a prediction slice of the AV stack for use at runtime.

One such aspect of the invention provides a method of analysing driving behaviour in a data processing computer system, the method comprising:
  receiving at the data processing computer system driving behaviour data to be analysed, wherein the driving behaviour data records vehicle movements within a monitored driving area, wherein the driving behaviour data comprises closed circuit television (CCTV) data collected from at least one CCTV image capture device arranged to monitor the driving area;
  analysing the driving behaviour data to determine a normal driving behaviour model for the monitored driving area;
  using object tracking to determine driving trajectories of vehicles driving in the monitored driving area; and
  using the driving trajectories to train a driving behaviour model for implementing in an on-board computer system of an autonomous vehicle for predicting the behaviour of an external vehicle.

In embodiments, the method may comprise the step of configuring an on-board computer system of an autonomous vehicle to implement the driving behaviour model, whereby the on-board computer system is configured to implement a decision engine configured to make autonomous driving decisions using behaviour predictions provided by the driving behaviour model.

The method may comprise the step of using at least one of the driving trajectories to generate driving scenario simulation data for simulating a driving scenario.

The driving behaviour may for example take the form of a spatial Markov model.

Another aspect provides an autonomous vehicle planner embodied in a computer system and configured to use the determined driving behaviour model as a basis for autonomous vehicle planning.

Another aspect provides a computer system comprising execution hardware configured to execute any method herein.

Further aspects of the invention provide an autonomous vehicle planner embodied in a computer system and an autonomous vehicle planning method which use the determined driving behaviour model as a basis for autonomous vehicle planning. That is, the normal driving behaviour model is used to make driving decisions for that area and AV control signals are generated for controlling an AV to implement those driving decisions in that area. A yet further aspect provides an autonomous vehicle comprising the autonomous vehicle planner and a drive mechanism coupled to the autonomous vehicle planner and responsive to control signals generated by the AV planner.

Another aspect provides a computer system for learning a predefined manoeuvre to be performed by an autonomous vehicle, the computer system comprising:
  a reinforcement learning component configured to run a plurality of driving scenario simulations, in each of which a series of ego vehicle actions is taking according to an attempted action policy;

wherein the reinforcement learning component is configured to execute a policy search algorithm to select action policies for attempting in the driving scenario simulations, with the objective of maximizing a cumulative reward assigned to the series of ego vehicle actions, and thereby determine an optimal action policy for performing the predefined manoeuvre in an encountered driving context, the cumulative reward is defined so as to penalize (i) actions which are determined to be unsafe and (ii) actions which are determined not to progress the predefined manoeuvre.

In embodiments, the cumulative reward may also be defined so as to penalize actions based on lack of comfort.

The cost function may take the form of a dynamic cost map.

Each driving scenario simulation may be based on a portion of real-world driving behaviour data.

A least one of the driving scenario simulations may be run based on driving scenario simulation data determined as above.

At least one of the driving scenario simulations may include an instance of abnormal driving behaviour data, that simulation being run based on driving scenario simulation data determined as above.

Another aspect provides a computer program comprising executable instructions configured, when executed one or more computer processors, to implement the steps or system functionality of any preceding claim Further aspects of the invention provide a computer system comprising execution hardware configured to execute any of the method steps disclosed herein, and a computer program comprising executable instructions configured, when executed, to implement any of the method steps.

BRIEF DESCRIPTION OF FIGURES

For a better understanding of the present invention, and to show how embodiments of the same may be carried into effect, reference is made to the following figures in which.

DETAILED DESCRIPTION

Figure 1:
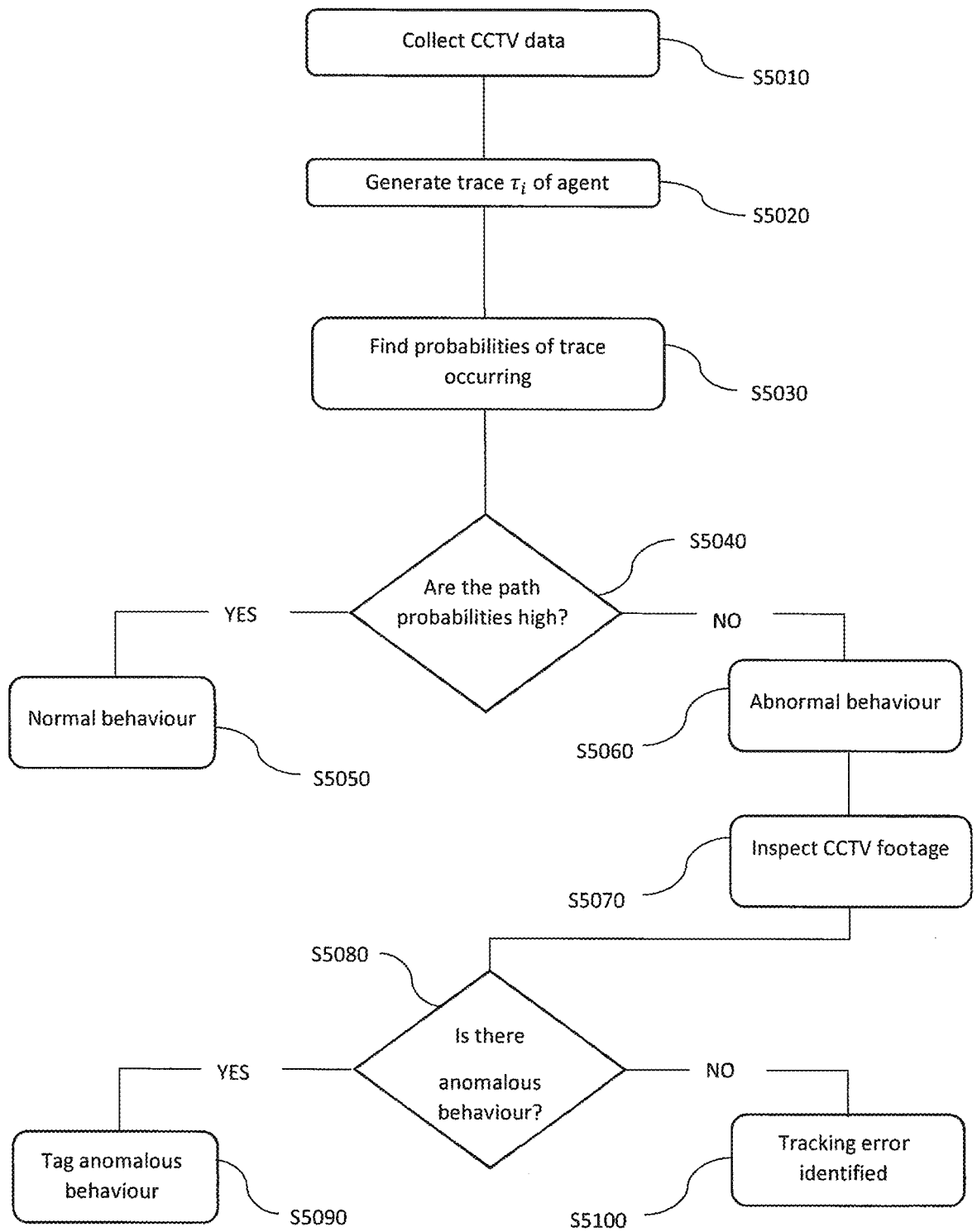
FIG. 1 shows a flowchart for a method of automatically extracting unusual driving scenarios from real-world driving data.

Specific embodiments are described by way of example below. First some useful context to the described embodiments is provided.

For an autonomous vehicle (AV) to travel from its current location to a chosen destination, it must determine how to navigate the route, taking into account both the known fixed constraints of the road layout, and the other vehicles on the road. This involves hierarchical decision making in which higher level decisions are incrementally broken down into increasingly fine-grained decisions needed to implement the higher-level decisions safely and effectively.

By way of example, the journey may be broken down into a series of goals, which are reached by performing sequences of manoeuvres, which in turn are achieved by implementing actions.

These terms are used in the context of the described embodiments of the technology as follows.

A goal is a high-level aspect of planning such as a position the vehicle is trying to reach from its current position or state. This may be, for example, a motorway exit, an exit on a roundabout, or a point in a lane of the road at a set distance ahead of the vehicle. Goals may be determined based on factors such as a desired final destination of the vehicle, a route chosen for the vehicle, the environment in which the vehicle is in etc.

A vehicle may reach a defined goal by performing a predefined manoeuvre or (more likely) a time sequence of such manoeuvres. Some examples of manoeuvres include a right-hand turn, a left-hand turn, stopping, a lane change, overtaking, and lane following (staying in the correct lane). The manoeuvres currently available to a vehicle can perform depend on its immediate environment. For example, at a T-junction, a vehicle cannot continue straight, but can turn left, turn right, or stop.

At any given time, a single current manoeuvre is selected and the AV takes whatever actions are needed to perform that manoeuvre for as long as it is selected, e.g., when a lane following manoeuvre is selected, keeping the AV in a correct lane at a safe speed and distance from any vehicle in front; when an overtaking manoeuvre is selected, taking whatever preparatory actions are needed in anticipation of overtaking a vehicle in front and whatever actions are needed to overtake when it is safe to do so etc.

Given a current selected manoeuvre, a policy is implemented to inform the vehicle which actions should be taken to perform that manoeuvre. Actions are low-level control operations which may include, for example, turning the steering wheel 5 degrees clockwise or increasing pressure on the accelerator by 10%. The action to take may be determined by considering both the state of the vehicle itself, including current position and current speed, its environment, including the road layout and the behaviour of other vehicles or agents in the environment. The term "scenario" may be used to describe a particular environment in which a number of other vehicles/agents are exhibiting particular behaviours.

Policies for actions to perform a given a manoeuvre in a given scenario may be learnt offline using reinforced learning or other forms of ML training, as described later.

It will be appreciated that the examples given of goals, manoeuvres and actions are non-exhaustive, and others may be defined to suit the situation the vehicle is in.

It is noted that, although the present techniques are described in the context of modelling driving behaviour of other vehicles, those same techniques could be applied to generate behaviour models for other actors (pedestrians, cyclists etc.). Thus, for example, a normal behaviour model and instances of abnormal behaviour can be determined for different types of actor using the same methods. Such models can also be used as a basis for AV planning. It will thus be appreciated that all description herein pertaining to external vehicles and driving behaviour applies equally to other types of actor which may be encountered in a driving scenario and their behaviour.

Specific embodiments of the invention will now be described by way of example only.

Learning/Mining Scenarios from Data

In the following examples, real life driving behaviour data, such as CCTV image data, is used to both generate models for training and for predicting behaviour of actors while driving.

Real life data may be collected for a fixed area over a period of time. The period over which data is collected may be, for example, 24 hours to try to generate an accurate representation of the movement of traffic through the area. Locations may be small, such as a junctions. An area may be chosen which have a high volume of traffic passing through them, in order to maximize the likelihood of encountering abnormal driving behaviour.

Data about the road layout (driving context) is be collected. This may be from a map, such as a HD (high definition) map, or it may be collected from the CCTV footage, and inputted either manually or automatically. For example, the CCTV footage may be manually annotated.

Information about the locations and movements of the actors in the collected data is extracted from the collected data, and used to build a spatial Markov (state-transition) model (SMM) of normal driving behaviour. The state-transition model is a discrete cell approximation model may be used to provide a simplified representation of normal behaviour. To achieve this, a grid may be applied to the location captured in the CCTV footage. This grid may be in the range of 5-10 cm per cell.

The behaviour of the agents in each grid cell may then be analysed over the time period in question. The information that is extracted in this analysis may for example include the frequency of occupancy of each grid element over the time period of the collected data, and the number of transitions made during the time period from each element to its surrounding elements. This information can then be used to assign an occupancy probability estimate $p_i$ to each grid cell and a transition probability estimate $p_{i,j}$ to each pair of grid cells i,j.

Figure 4:
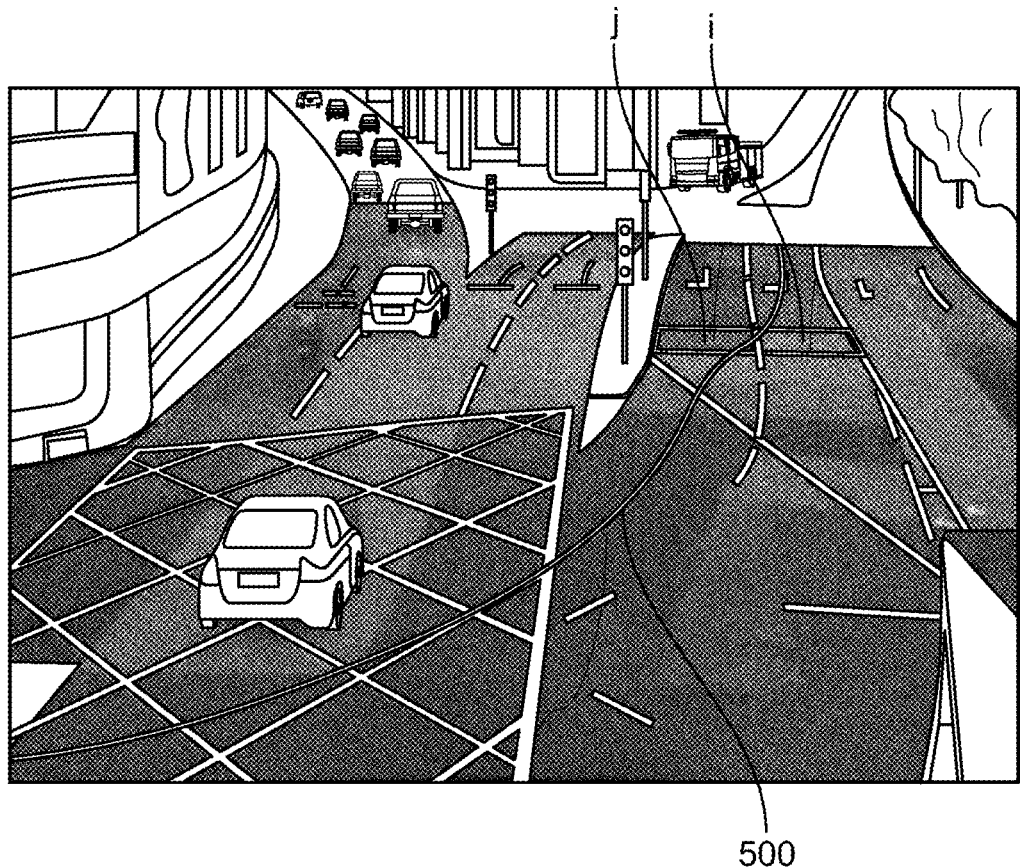
FIG. 4 shows an example of a spatial Markov model which models normal driving behaviour in an area monitored by CCTV.

By way of example, FIG. 4 shows a SMM determined for road layout within the field of view of a CCTV camera. The road layout in this case is part of a relatively complex junction, on which fixed grid has been superimposed. Two cells of the grid are denoted by reference signs i and j by way of example, and have occupancy probabilities $p_i$ and $p_j$ determined through observation of real-world traffic. The transition probability $p_{i,j}$ between cells i and j is the probability of an actor moving directly from cell i to cell j, also determined through observation.

A method of using such a determined SMM as a basis for detecting abnormal driving behaviour will now be described with reference to FIG. 1. The method is computer-implemented, being carried out by one or more suitably-programmed or otherwise-configured computer processors, such as CPU(s), GPU(s)/accelerators, ASICs, FPGAs etc.

At step S5010, CCTV data is collected for the area for which the SMM model was determined. This may be the same CCTV footage that was used to create the SMM model or it may be from a different time.

At step S5020, a trace $\tau_i$ is determined for each vehicle i identified in the footage using an object tracking algorithm applied to the CCTV footage. The trace of the vehicle may be generated for the entire time the agent is travelling through the area captured in the CCTV footage. There are many state of the art object tracking algorithms that may be used for this purpose, one example being YOLO (You Only Look Once).

At step S5030, the probability of the (or each) trace $\tau_i$ occurring given the model is estimated. This may be expressed as a conditional probability as follows:

$p(\tau_i | M_{S,T})$ where $M_{S,T}$ is the state transition model. This expresses how likely it is for the trace $\tau_i$ to have occurred, given the state-transition model $M_{S,T}$—where that probability is low, this may indicate abnormally driving behaviour that deviates from the driving behaviour captured in the state-transition model.

Taking cells i and j in FIG. 4 as an example, the probability of a trace "transitioning" from cell i to cell j (i.e. passing directly from cell i to cell j) would take into account both their occupancy probabilities $p_i$, $p_j$ and the transition probability $p_{i,j}$. An example of such a trace is shown denoted by reference numeral 500. As will be appreciated, this is one of many possible traces transitioning between those cells. The overall probability of the trace 500 given the model $M_{S,T}$ will take into account the occupancy probabilities for all of the cells it intersects and the transition probabilities of all of the cells between which it transitions.

At step S5060, it is determined if the probabilities of the traced path are high. If they are high, so likely to occur, the behaviour of the agent is deemed to be normal, step S5050. However, if the probabilities are low, the behaviour is deemed to be abnormal, step S5060. This could for example be define with reference to a set threshold.

Having identified a trace as abnormal, a portion of the driving behaviour data (e.g. CCTV data) associated with the abnormal trace can be automatically extracted based on a timing of the abnormal trace. For example, a portion of the CCTV data spanning a time interval from the time at which the vehicle exhibiting the trace entered the monitored driving area to the time at which it exited the driving area, or any other suitable time interval in which at least part of the abnormal behaviour (as indicated by the abnormal trace) is captured.

There are two possible reasons for anomalous driving behaviour being detected. Firstly, there may be an error in the object tracking model. This situation is of less interest in the present context.

The other possibility is that anomalous (abnormal) driving has occurred. Examples of anomalous driving may be illegal U-turns or turning into a no-entry road. These driving behaviours are not common but do occur in the real world. They would not typically be predicted by models which are only based on known driving rules, particularly if an indecent of behaviour violates the rules of the road.

In some cases, in order to determine if the tracked path is correct, the CCTV footage collected is inspected at step S5070, to check whether or not abnormal driving behaviour has occurred in the relevant portion of the footage. This can be an automated or manual check.

Once real-life anomalous driving behaviour has been identified, it can be used when constructing scenarios for reinforcement learning on the section of road analysed such that the training vehicle is presented with the actual behaviours exhibited by the agents in the captured CCTV. This gives the system more accurate data to train with, and helps it to prepare for anomalous driving which may occur when the vehicle is on the road.

The model can also be used as a basis for autonomous vehicle planning in an area for which a model has been pre-determined in this manner, wherein an AV planner uses the predetermined model to make driving decisions in that area.

Artificial Scenario Generation

The anomalous driving behaviour observed can also be used to train the scenario generator to construct new, more life-like, scenarios for training, such that the scenarios generated are artificial and do not use the collected data directly, but do contain actors performing anomalous driving behaviours similar to those observed. This may, for example, be through the use of generative adversarial networks (GANs).

A GAN comprises two networks, a first of which (the generator) generates driving scenarios and the second of which (the classifier) classifies the real and the generated driving scenarios in relation to the set of training data as "real", i.e. belonging to the training set, or "artificial" (generated), i.e. not belonging to the training set. The adversarial aspect is that the generator is incentivised (via a suitably-defined loss function) to try to "beat" the classifier by generating driving scenarios that the classifier classifies, incorrectly, as "real", whereas the classifier is incentivised to try to beat the generator by classifying the driving scenarios accurately as real or artificial. As the networks are trained, the generator is pushed to get better and better at generating realistic driving scenarios capable of fooling the increasing accurate classifier, such that, by the end of the process, the generator is capable of generating highly driving scenarios, i.e. which are hard to distinguish from the training examples. The networks are incentivised via suitably defined loss functions applied to their respective outputs.

The analysis of the real-life data may, in some cases, highlight locations where standard behaviour is not followed by agents. If there is a common route through the location which the agents take, but is not predicted by standard behaviour, this virtual lane can be identified and learnt for use during planning. This could then for example be used as a basis for inverse planning, wherein the AV planner may be biased towards following the common route generally followed by other vehicles.

First Example Use—Case—AV Planning

Examples of how a normal behaviour model, determined as above, may be used for AV planning will now be described.

Figure 3:
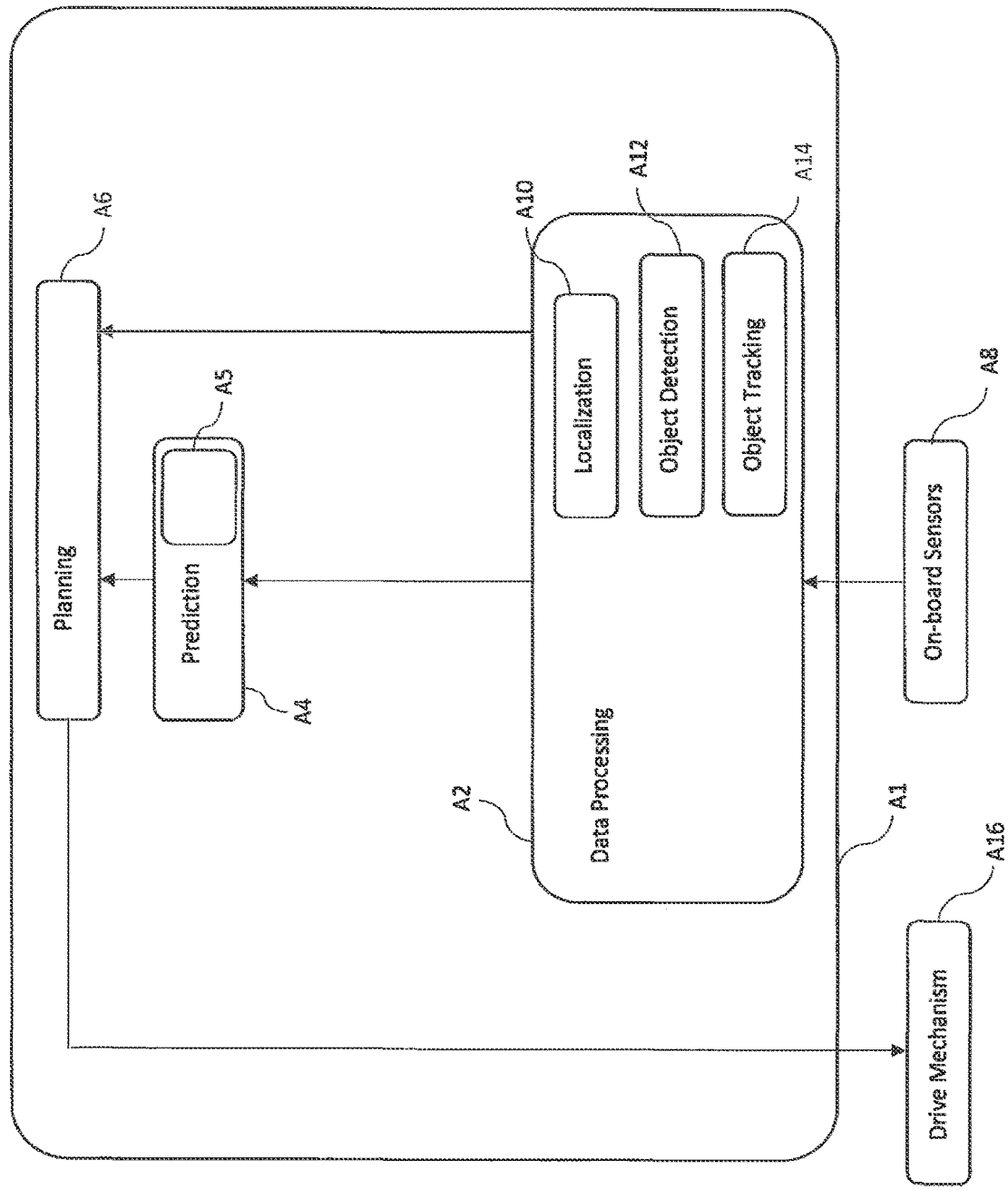
FIG. 3 shows a schematic functional block diagram showing functional components of an AV runtime stack implemented in an autonomous vehicle computer system.

FIG. 3 shows a highly schematic functional block diagram of certain functional components embodied in an on-board computer system A1 of an AV (ego vehicle) as part of an AV runtime stack, namely a data processing component A2, a prediction component A4 and an AV planner A6.

The data processing component A2 receives sensor data from an on-board sensor system A8 of the AV. The on-board sensor system A8 can take different forms but generally comprises a variety of sensors such as image capture devices (cameras), LiDAR units etc., satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and other actors (vehicles, pedestrians etc.) within that environment.

Note however that the present-techniques are not limited to using image data and the like captured using on-board optical sensors (image capture devices, lidar etc.) of the AV itself. The method can alternatively or additionally be applied using externally-captured sensor data, for example CCTV images etc. captured by external image capture units in the vicinity of the AV. In that case, at least some of the sensor inputs used to implement the method may be received by the AV from external sensor data sources via one or more wireless communication links.

The data processing system A2 processes the sensor data in order to extract such information therefrom. This will generally involve various forms of machine learning (ML)/artificial intelligence (AI) processing. Functions of the data processing system A2 that are relevant in the present context include localization (block A10), object detection (block A12) and object tracking (block A14).

Localization is performed to provide awareness of the surrounding environment and the AV's location within it. A variety of localization techniques may be used to this end, including visual and map-based localization. By way of example, reference is made to United Kingdom patent Application No. 1812658.1 entitled "Vehicle Localization", which is incorporated herein by reference in its entirety. This discloses a suitable localization method that uses a combination of visual detection and predetermined map data. Segmentation is applied to visual (image) data to detect surrounding road structure, which in turn is matched to predetermined map data, such as a HD (high-definition) map, in order to determine an accurate and robust estimate of the AV's location, in a map frame of reference, in relation to road and/or other structure of the surrounding environment, which in turn is determined through a combination of visual detection and map-based inference by merging visual and map data. To determine the location estimate, an individual location estimate as determined from the structure matching is combined with other location estimate(s) (such as GPS) using particle filtering or similar, to provide an accurate location estimate for the AV in the map frame of reference that is robust to fluctuations in the accuracy of the individual location estimates. Having accurately determined the AV's location on the map, the visually-detected road structure is merged with the predetermined map data to provide a comprehensive representation of the vehicle's current and historical surrounding environment in the form of a live map and an accurate and robust estimate of the AV's location in the map frame of reference. The term "map data" in the present context includes map data of a live map as derived by merging visual (or other sensor-based) detection with predetermined map data, but also includes predetermined map data or map data derived from visual/sensor detection alone.

Object detection is applied to the sensor data to detect and localize external objects within the environment such as vehicles, pedestrians and other external actors whose behaviour the AV needs to be able to respond to safely. This may for example comprise a form of 3D bounding box detection, wherein a location, orientation and size of objects within the environment and/or relative to the ego vehicle is estimated. This can for example be applied to (3D) image data such as RGBD (red green blue depth.), LiDAR point cloud etc. This allows the location and other physical properties of such external actors to be determined on the map.

Object tracking is used to track any movement of detected objects within the environment. The result is an observed trace ($\tau$) of each object that is determined over time by way of the object tracking. The observed trace T is a history of the moving object, which captures the path of the moving object over time, and may also capture other information such as the object's historic speed, acceleration etc. at different points in time.

Used in conjunction, object detection and object tracking allow external actors to be located and tracked comprehensively on the determined map of the AV's surroundings.

Object detection and object tracking are well-known per-se, and can be performed in the present context using various publicly available state-of-the-art models.

Through the combination of localization, object detection and object tracking, the data processing component A2 provides a comprehensive representation of the ego vehicle's surrounding environment, the current state of any external actors within that environment (location, heading, speed etc. to the extent they are detectable), as well as the historical traces of such actors which the AV has been able to track. This is continuously updated in real-time to provide up-to-date location and environment awareness.

The prediction component A4 uses this information as a basis for a predictive analysis, in which it makes predictions about future behaviour of the external actors in the vicinity of the AV. Examples of suitable prediction methodologies are described below.

The AV planner A6 uses the extracted information about the ego's surrounding environment and the external agents within it, together with the behaviour predictions provided by the prediction component A4, as a basis for AV planning. That is to say, the predictive analysis by the prediction component A4 adds a layer of predicted information on top of the information that has been extracted from the sensor data by the data processing component, which in turn is used by the AV planner A6 as a basis for AV planning decisions. This is generally part of hierarchical planning process, in which the AV planner A6 makes various high-level decisions and then increasingly lower-level decisions that are needed to implement the higher-level decisions. The end result is a series of real-time, low level action decisions.

In order to implement those decisions, the AV planner A6 generates control signals, which are input, at least in part, to a drive mechanism A16 of the AV, in order to control the speed and heading of the vehicle (e.g. though steering, breaking, accelerating, changing gear) etc. Control signals are also generated to execute secondary actions such as signalling.

In accordance with the present example, the predictive component A4 uses the normal driving behaviour model (labelled A5 in FIG. 3) in order to predict the behaviour of external actors in the driving area currently, for example by assuming that external agents will follow trajectories indicated by the normal driving behaviour model at least in certain circumstances. This may use observed parameter(s) of the external driving actors, as derived from the sensor inputs, in combination with the normal driving behaviour model to predict the behaviour of the external actors.

Second Example Use—Case—Reinforcement Learning for Manoeuvres

An example will now be considered, in which manoeuvres are performed according to "action policies". An AV planner embodied in an on-board computer system of the AV can use an action policy to determine a series of actions to be taken in order to perform a desired manoeuvre in an encountered driving scenario. The manoeuvre to be performed may be selected in a higher-level planning process.

As noted, a driving scenario generally refers to a driving context (such as a particular road layout) within which the manoeuvre is to be performed, and within which any number of external vehicles or other external actors (such as pedestrians) may be present. In the present context, in determining what actions to take in accordance with an action policy, both the driving context and the behaviour of any such external actors is taken into account.

The action policy may be executed in a computer system—such as the on-board computer system of an AV performing the desired manoeuvre (the "ego" vehicle)—as a function which takes an input state ($s_t$) at a given time instant t and outputs an ego vehicle action ($a_t$) to be taken at that time instant t, in order to progress the desired manoeuvre. The state $s_t$ captures information about the ego vehicle in relation to the driving scenario encountered by the ego vehicle at time t. In other words, the state $s_t$ captures a situation in which the ego vehicle finds itself at time t, in relation to its surroundings, i.e. in relation to the driving context (e.g. road layout) and any external actors within that driving contents. This state $s_t$ may for example comprise location information about the (observed or expected) location of surrounding road structure and external actors relative to the ego vehicle and motion information about the (observed or expected) motion of one or more external actors relative to the vehicle (such as speed/velocity, acceleration, jerk etc.). This may be captured at least in part using on-board sensors of the AV.

In some aspects of the present disclosure, action policies are learned using reinforcement learning (RL).

Hence there is provided a computer system for learning a predefined manoeuvre to be performed by an autonomous vehicle, the computer system comprising a reinforcement learning component configured to run a plurality of driving scenario simulations, in each of which a series of ego vehicle actions is taking according to an attempted action policy. The reinforcement learning component is configured to execute a policy search algorithm to select action policies for attempting in the driving scenario simulations, with the objective of maximizing a cumulative reward assigned to the series of ego vehicle actions, and thereby determine an optimal action policy for performing the predefined manoeuvre in an encountered driving context. The cumulative reward is defined so as to penalize (i) actions which are determined to be unsafe and (ii) actions which are determined not to progress the predefined manoeuvre.

Additionally, the cumulative reward may also be defined so as to penalize actions based on comfort, for example actions which result in excessive jerk (rate of change of acceleration).

Generally, a simulated driving scenario provides a simulated driving context (e.g. road layout) and simulated behaviour of one or more simulated external actors ("external agents") within that driving context. For example, given a simulated driving scenario and an initial configuration (e.g. location, velocity, acceleration etc.) for a simulated ego vehicle ("ego agent") at time t=0, an initial state $s_0$ may be determined based on the initial configuration of ego vehicle within the driving context and an initial configuration of the one or more external actors (e.g. location, velocity acceleration etc.) relative to the ego vehicle. A currently-selected action policy may be used to determine an initial ego vehicle action $a_0$.to take based on the initial state $s_0$. A new state for the ego vehicle $s_1$ (state at time t=1) is determined based on both the initial ego vehicle action $a_0$ and the simulated external actor behaviour, i.e. taking into account any changes in the configuration of the ego vehicle cause by action $a_0$ but also any changes in the configuration of the external actor(s) caused by their own simulated behaviour. This process is performed repeatedly, with the state $s_t$ at time t being used to select an ego vehicle action $a_t$ in accordance with the currently-selected action policy, and the state at time t+1 being determined based on both $a_t$ and the simulated external actor behaviour.

The cumulative reward may penalize the relevant actions according to predetermined reward criteria.

Individual rewards may be determined based on a cost function, which defines costs (penalties) to be applied to different actions at a particular time t.

The cost function may be in the form of a "cost map" defined over an area surrounding the ego vehicle, wherein costs may be computed and updated for points in that area (corresponding to locations relative to the ego vehicle) based on the factors disclosed herein. Costs can vary over time as the scenario develops.

Figure 2:
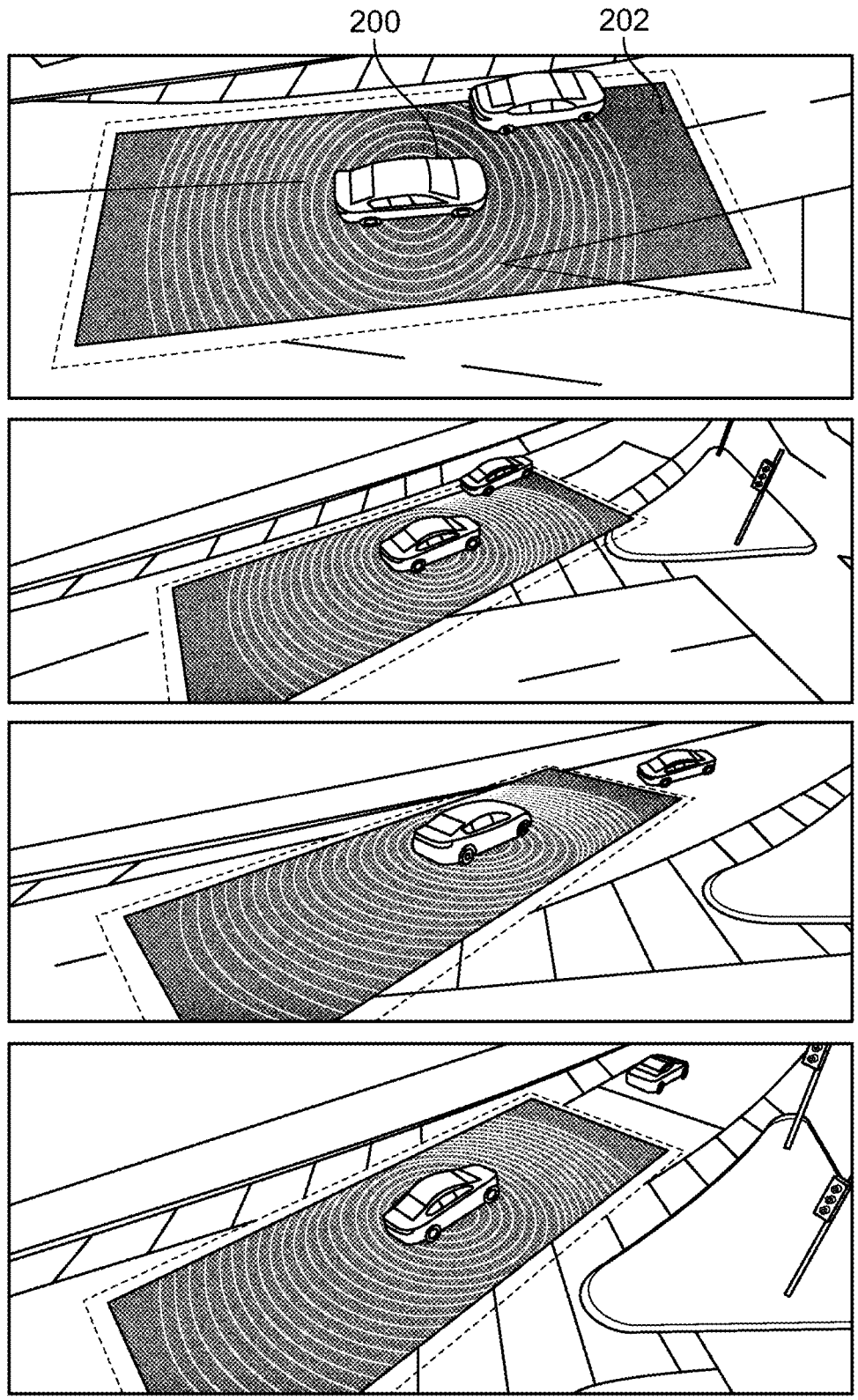
FIG. 2 schematically illustrates an example reinforcement learning process for manoeuvre learning.

An example of a dynamic cost map at different times is shown in FIG. 2, in which an ego AV agent is marked 200, and the cost map 202 is depicted in an area bounded by a dotted line. Darker shading denotes higher costs (greater penalty). The cost assigned to an attempt is defined by the path traced by the vehicle and the costs assigned to points along that path at the respective times they are traversed by the ego AV agent, which may depend on the locations of any external vehicles/actors at those respective times.

For example, an individual reward may be assigned to each action $a_t$ using a pre-determined immediate reward function, which penalizes the relevant actions, and the cumulative reward may be determined for a series of actions by cumulating the individual rewards assigned thereto.

In a first such aspect of the present disclosure, a data processing component is configured to receive real-world driving scenario data, as collected by monitoring real-world behaviour in at least one real-world driving context, and process the real-world driving scenario data to driving scenario simulation data. The simulated driving scenarios are then run based on the simulated driving scenario data.

The use of real-world driving scenario data allows more realistic driving scenarios to be simulated for the purposes of RL. In particular, it allows more realistic external actor behaviour to be simulated within a simulated driving context.

As will be appreciated, the above description only considers some examples of suitable models for modelling expected vehicle behaviour. Other examples of suitable models include Markov Decision Process models and rewards to the data. In this case, training is performed by fitting a Markov Decision Process model and rewarding to the data.

The above processes (including scenario mining, training and inference) may be performed the hardware level, an off-board computer system (e.g. a server outwork of served) or the on-board computer system A1 of the A. The on-board or off-board computer system comprises execution hardware capable of executing algorithms to carry out the above functions. Whilst the execution hardware can be general purpose or special purpose execution hardware, or any combination thereof, it will generally comprise one or more processors such as central processing units (CPUs) and which may operate in conjunction with specialized hardware such as, but not limited to, accelerators (e.g. GPU(s)), field programmable gate-arrays (FPGAs) or other programmable hardware, and/or application-specific integrated circuits (ASICs) etc. Given the need to perform complex data processing operations, often using sophisticated and complex ML/AI models, with sufficient accuracy and speed (often in real-time) to ensure safe and reliable operation, the on-board computer system may be highly sophisticated, possibly with specialized computer hardware tailored to implement the models and algorithms in question. Particularly given the speed at which innovation is progressing in the field of AI, it will be appreciated that the architecture of the AV on-board computer system A1 at both the hardware level and the functional/software level may take numerous forms. Herein, functional components and the like embodied in a computer system—such as the data processing component A2, prediction component A4 and AV planner A6—are high-level representation of particular functionality implemented by the computer system, i.e. functions performed by whatever (combination of) general purpose and/or specialized hardware of the computer system that is appropriate in the circumstances.

The invention claimed is:

1. A method of analysing driving behaviour in a data processing computer system, the method comprising:
   receiving at the data processing computer system driving behaviour data to be analysed, wherein the driving behaviour data records vehicle movements within a monitored driving area;
   analysing the driving behaviour data to determine a normal driving behaviour model for the monitored driving area;
   using object tracking to determine driving trajectories of vehicles driving in the monitored driving area;
   comparing the driving trajectories with the normal driving behaviour model to determine a conditional probability $p(\tau_n|M)$ of each driving trajectory $\tau_n$, which is a probability of that trajectory m occurring given the normal behaviour model M, and identify at least one abnormal driving trajectory; and
   extracting a portion of the driving behaviour data corresponding to a time interval associated with the abnormal driving trajectory.

2. The method of claim 1, wherein the at least one driving trajectory is classed as abnormal with respect to a probability threshold.

3. The method of claim 1, wherein the normal driving behaviour model is a spatial Markov model (SMM) based on a plurality of spatial regions within the monitored driving area, wherein at least one of the following is computed:
   an estimated occupancy probability associated with each spatial region, and
   an estimated transition probability associated with each of a plurality of spatial region pairs.

4. The method of claim 3, wherein the conditional probability $p(\tau_n|M)$ is determined based on at least one of: the occupancy probabilities and the transition probabilities associated with a series of the spatial regions traversed by the driving trajectory $\tau_n$.

5. The method of claim 3, wherein the spatial regions are cells of a grid overlaid on the monitored driving area, the grid being shaped to take into account road structure and/or other structure in the monitored driving area.

6. The method of claim 5, wherein the structure is manually determined or automatically determined from a map associated with the driving area.

7. The method of claim 1, wherein the driving behaviour data is in the form of image data.

8. The method of claim 1, wherein the driving behaviour data is in the form of image data comprising closed circuit television (CCTV) data collected from at least one CCTV image capture device arranged to monitor the driving area.

9. The method of claim 1, comprising the step of processing the extracted portion of driving behaviour data in order to generate driving scenario simulation data for simulating a driving scenario in which an ego vehicle agent is exposed to abnormal driving behaviour exhibited by one or more external agents.

10. The method of claim 9, comprising the step of running the driving scenario simulation in a simulator in a training process, in order to train at least one component for an autonomous vehicle decision engine.

11. The method of claim 10, wherein the component is trained using reinforcement learning.

12. The method of claim 10, wherein the component is a policy for executing a selected manoeuvre.

13. The method of claim 10, wherein the simulated driving scenario is an approximation of a real-world driving scenario captured in the extracted portion of driving behaviour data.

14. The method of claim 10, wherein the simulated driving scenario is artificially-generated by a scenario generator trained on a training set of multiple examples of abnormal driving behaviour extracted from the driving behaviour data.

15. The method of claim 14, wherein the scenario generator takes the form of a generative adversarial network (GAN).

16. The method of claim 9, comprising the step of using the driving scenario simulation data running a simulated driving scenario in a simulator in a performance testing process, in order to performance test at least one component for implementing in an autonomous vehicle on-board computer system.

17. A computer system comprising:
an input configured to receive driving behaviour data to be analysed, wherein the driving behaviour data records vehicle movements within a monitored driving area; and
execution hardware configured to:
analyse the driving behaviour data to determine a normal driving behaviour model for the monitored driving area;
use object tracking to determine driving trajectories of vehicles driving in the monitored driving area;
compare the driving trajectories with the normal driving behaviour model to determine a conditional probability $p(\tau_n|M)$ of each driving trajectory $\tau_n$, which is a probability of that trajectory $\tau_n$ occurring given the normal behaviour model M, and to identify at least one abnormal driving trajectory; and
extract a portion of the driving behaviour data corresponding to a time interval associated with the abnormal driving trajectory.

18. A computer program embodied in a non-transitory computer-readable medium comprising executable instructions configured, when executed by one or more computer processors, to:
receive driving behaviour data to be analysed, wherein the driving behaviour data records vehicle movements within a monitored driving area;
analyse the driving behaviour data to determine a normal driving behaviour model for the monitored driving area;
use object tracking to determine driving trajectories of vehicles driving in the monitored driving area;
compare the driving trajectories with the normal driving behaviour model to determine a conditional probability $p(\tau_n|M)$ of each driving trajectory $\tau_n$, which is a probability of that trajectory $\tau_n$ occurring given the normal behaviour model M, and identify at least one abnormal driving trajectory; and
extract a portion of the driving behaviour data corresponding to a time interval associated with the abnormal driving trajectory.

* * * * *